United States Patent
Cory

(10) Patent No.: US 7,679,207 B2
(45) Date of Patent: Mar. 16, 2010

(54) AUGMENTED WIND POWER GENERATION SYSTEM USING CONTINUOUSLY VARIABLE TRANSMISSION AND METHOD OF OPERATION

(75) Inventor: Kenneth D. Cory, Carrollton, TX (US)

(73) Assignee: V3 Technologies, L.L.C., Dallas, TX (US)

( * ) Notice: Subject to any disclaimer, the term of this patent is extended or adjusted under 35 U.S.C. 154(b) by 179 days.

(21) Appl. No.: 11/803,837

(22) Filed: May 16, 2007

(65) Prior Publication Data

US 2008/0284170 A1 Nov. 20, 2008

(51) Int. Cl.
*H02P 9/04* (2006.01)
*F03D 9/00* (2006.01)

(52) U.S. Cl. ....................................... 290/44
(58) Field of Classification Search ................ 290/44
See application file for complete search history.

(56) References Cited

U.S. PATENT DOCUMENTS

| | | | | | |
|---|---|---|---|---|---|
| 3,883,750 | A * | 5/1975 | Uzzell, Jr. | ...................... | 290/55 |
| 4,079,264 | A * | 3/1978 | Cohen | ...................... | 290/55 |
| 4,288,199 | A * | 9/1981 | Weisbrich | .................... | 415/232 |
| 4,332,518 | A * | 6/1982 | Weisbrich | .................... | 415/232 |
| 5,062,765 | A * | 11/1991 | McConachy | .................... | 415/4.3 |
| 5,146,096 | A * | 9/1992 | McConachy | .................... | 290/44 |
| 5,182,458 | A * | 1/1993 | McConachy | .................... | 290/55 |
| 5,520,505 | A * | 5/1996 | Weisbrich | .................... | 415/4.1 |
| 6,616,402 | B2 * | 9/2003 | Selsam | ...................... | 415/3.1 |
| 6,856,040 | B2 * | 2/2005 | Feddersen et al. | ............. | 290/44 |
| 6,933,625 | B2 * | 8/2005 | Feddersen et al. | ............. | 290/44 |
| 7,011,498 | B2 * | 3/2006 | Vos et al. | ...................... | 416/28 |
| 7,015,595 | B2 * | 3/2006 | Feddersen et al. | ............. | 290/44 |
| 7,115,066 | B1 * | 10/2006 | Lee | .............. | 477/15 |
| 7,484,363 | B2 * | 2/2009 | Reidy et al. | .................... | 60/398 |
| 2002/0091036 | A1 * | 7/2002 | Bott et al. | .................... | 477/156 |
| 2002/0131864 | A1 * | 9/2002 | Vos et al. | .................... | 416/25 |
| 2004/0247437 | A1 * | 12/2004 | Otaki et al. | ............. | 416/132 B |
| 2005/0118021 | A2 * | 6/2005 | Vos et al. | .................... | 416/25 |
| 2006/0112688 | A1 * | 6/2006 | Vos et al. | .................... | 60/598 |
| 2006/0205553 | A1 * | 9/2006 | Lee | ................ | 475/5 |
| 2008/0284171 | A1 * | 11/2008 | Cory | .......................... | 290/44 |
| 2009/0146435 | A1 * | 6/2009 | Freda | .......................... | 290/55 |

OTHER PUBLICATIONS

C. Gallo et al., Design and Dynamic Simulation of a Fixed Pitch 56 kW Wind Turbine Drive Train with a Continuously Variable Transmission, NASA, Mar. 1986, http://ntrs.nasa.gov/archive/nasa/casi.ntrs.nasa.gov/19870007968_1987007968.pdf.*

* cited by examiner

*Primary Examiner*—Joseph Waks
*Assistant Examiner*—Pedro J Cuevas

(57) ABSTRACT

A wind power generating apparatus is provided. The apparatus includes a plurality of vertically stacked wind acceleration modules that are shaped to accelerate wind passing between them. At least one of the modules includes a rotor assembly, a continuously variable transmission (CVT) mechanically coupled to the rotor assembly, and an electrical generator mechanically coupled to the CVT. The electrical generator is capable of converting mechanical energy transferred by the CVT from the rotor assembly into electrical energy. A sensor may be mechanically coupled to the rotor assembly or the electrical generator and electrically coupled to a controller. The controller may control the CVT according to a signal received from the sensor such that the electrical generator operates within a predetermined range of rotational velocities.

18 Claims, 5 Drawing Sheets

AUGMENTED WIND POWER GENERATION SYSTEM USING CONTINUOUSLY VARIABLE TRANSMISSION AND METHOD OF OPERATION

TECHNICAL FIELD OF THE INVENTION

The present application relates generally to electrical power generation and, more specifically, to an apparatus and method for generating electrical power from wind.

BACKGROUND OF THE INVENTION

The environmental costs of fossil fuels and the political instabilities of oil-producing regions have intensified efforts to develop alternative energy sources that are environmentally clean and more reliable. Wind-driven power generation systems are of particular interest. Wind power may be converted to electrical power using a rotor assembly, either horizontally or vertically oriented. The rotor blades convert the energy of the moving air into a rotational motion of a drive shaft. An electrical generator coupled to the drive shaft then converts the rotational motion into electrical power. Typically, a fixed-ratio gear box converts the low rotation speed of the rotor assembly to a higher rotation speed for the electrical generator.

A conventional wind-driven power generation system is typically a monopole tower with a single rotor rotating about a hub located at or near the top of the tower. The tower produces power only when the wind blows, only within a certain range of wind velocities, and at a maximum power output level for an even smaller range of wind velocities. As a result, wind power generation has traditionally been expensive to produce and not reliably available. In response, conventional wind turbine manufacturers' designs have evolved towards very large rotor assemblies and very tall towers in order to gain economies of scale and to reach higher velocity and steadier winds at higher altitudes.

However, a larger rotor assembly rotates more slowly than a smaller rotor assembly and requires a higher gear ratio to provide an optimal rotational speed range for the electrical generator. A larger rotor assembly also has a greater mass, requiring stronger winds to cause rotation. Furthermore, a larger rotor assembly applies greater torque stress to a gear box, requiring that the gear box be larger in size and made of more exotic and expensive materials. Finally, even with exotic materials and sturdier supports, a larger rotor assembly is still limited to a lower maximum wind speed at which the rotor assembly can operate without causing damage to the mechanical components of the wind tower.

An augmented wind power generation system uses a funneling apparatus, for example a fully or partially shrouded rotor, to increase the velocity of the ambient wind across a smaller rotor assembly. Such funneling apparatuses may be vertically stacked into a tower with one or more rotor assemblies located in each apparatus. Such wind amplification devices are described in U.S. Pat. No. 4,156,579 (Weisbrich), U.S. Pat. No. 4,288,199 (Weisbrich), U.S. Pat. No. 4,332,518 (Weisbrich), U.S. Pat. No. 4,540,333 (Weisbrich), and U.S. Pat. No. 5,520,505 (Weisbrich). All five Weisbrich patents are hereby incorporated by reference as if fully set forth herein.

The wind speed amplification effect of the funnel permits power generation to occur at lower ambient wind speeds. Specifically, because the electrical power generated from wind is a cubic function of the wind's velocity, a smaller rotor assembly can generate similar amounts of power to a larger rotor with an equal amount of ambient wind. In other words, the rotor assemblies of an augmented wind power generation system are typically smaller than those in a traditional wind tower, and therefore have a smaller mass and higher rotational speeds. As a result, some augmented turbines rely on low rpm generators and require no gear box while others require a gear box with lower gear ratios that are made of more conventional, less expensive materials.

Although providing benefits over a larger rotor assembly, both configurations of augmented wind power generation systems described above continue to be constrained by inefficiencies in gear box and or generator performance. As a result, energy is lost due to the use of less than ideal generators or to a limitation of wind speed environments in which the turbine and gear box assembly can operate without causing damage to the components of the system. Therefore, there is a need in the art for an improved apparatus and method for converting energy from wind into electrical power.

SUMMARY OF THE INVENTION

A wind power generating apparatus is provided. The apparatus includes a plurality of vertically stacked wind acceleration modules that are shaped to accelerate wind passing between them. At least one of the modules includes a rotor assembly, a continuously variable transmission (CVT) mechanically coupled to the rotor assembly, and an electrical generator mechanically coupled to the CVT. The electrical generator is capable of converting mechanical energy transferred by the CVT from the rotor assembly into electrical energy A method for generating power from wind is provided, for use with a plurality of vertically stacked wind acceleration modules. The method includes transmitting mechanical energy from a rotor assembly mounted in one of the modules to an electrical generator through a transmission having an input mechanically coupled to the rotor assembly and an output. The method also includes varying the ratio of the rotational speed of the transmission input to the rotational speed of the transmission output over a continuous range of values. The method further includes generating electrical energy with an electrical generator mechanically coupled to the transmission output.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware or in a combination of hardware with firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged augmented wind power generation system.

Figure 1:
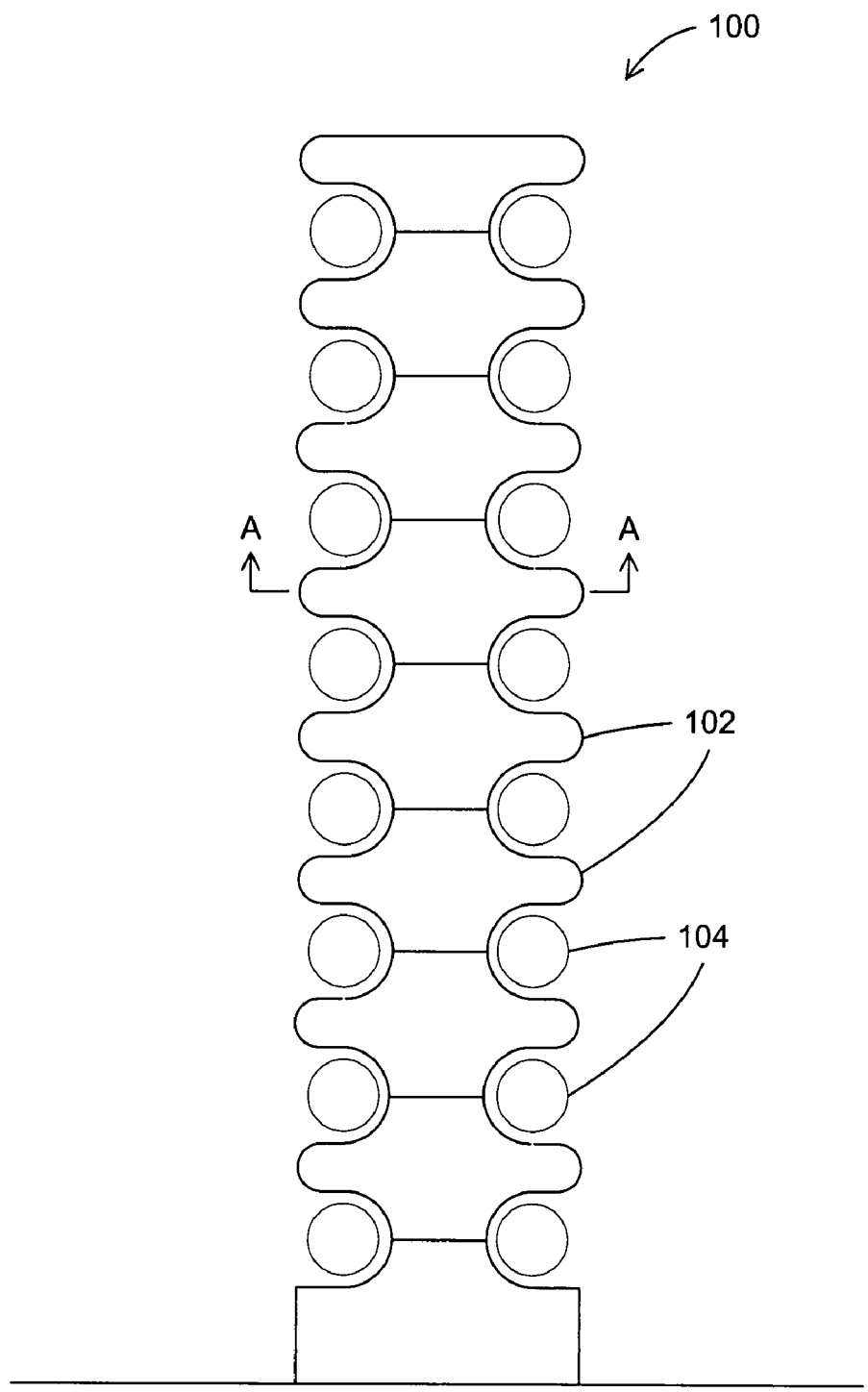
FIG. 1 illustrates an augmented wind power generation system according to the disclosure.

FIG. 1 illustrates an augmented wind power generation system 100 according to the disclosure. The system 100 comprises an internal central tower (not shown in FIG. 1) and a plurality of preferably stationary vertically stacked wind acceleration modules 102. The modules 102 are shaped to create semi-toroidal hollows around the tower. That is, the modules are substantially circularly symmetrical about a vertical axis, having an outer surface contour as shown in FIG. 1. The shape of modules 102 has the effect of increasing the velocity of wind flowing around the tower through the hollows in the modules. Rotor assemblies 104 may be located in the exterior hollows of one or more of the modules 102 to convert kinetic energy of wind flowing through the hollows into rotational energy of the rotor assemblies 104.

Typically, pairs of the rotor assemblies 104 are located in the hollows on opposite sides of the system 100, in order to convert the energy of the wind flowing around both sides of the system 100 into rotational energy. Furthermore, the pairs of rotor assemblies 104 are typically rotationally mounted to the central tower to permit the rotor assemblies 104 to adapt to changes in wind direction by rotating around the system 100 to face into the wind. The rotation of a pair of the rotor assemblies 104 in one semi-toroidal hollow may be independent of the rotation of a pair of the rotor assemblies 104 in another of the semi-toroidal hollows, enabling the system 100 to adapt to wind from differing directions at different heights of the system 100. The height of system 100 may be measured in hundreds of feet and wind direction may be substantially different at ground level than at higher elevations.

Figure 2:
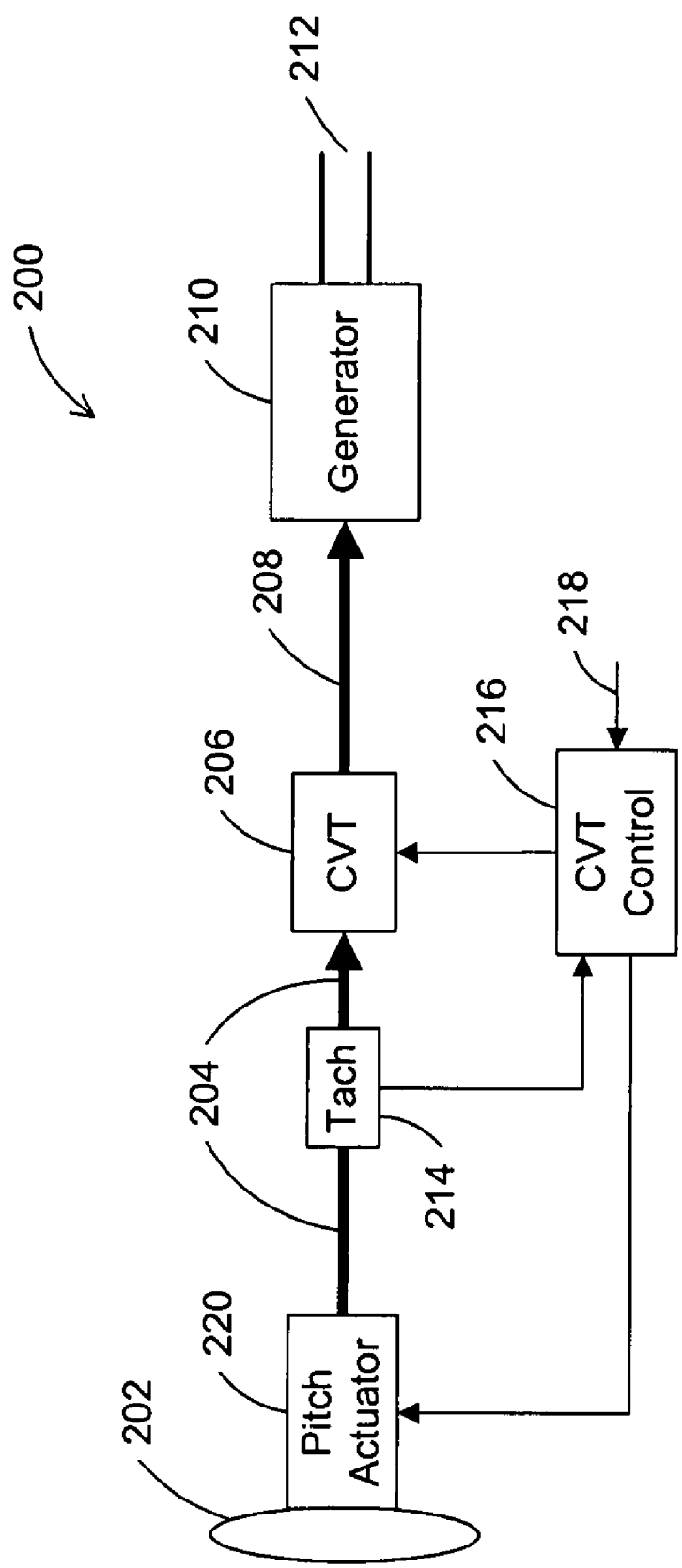
FIG. 2 illustrates a schematic view of an embodiment of the disclosure.

FIG. 2 illustrates a schematic view of an apparatus 200 according to the disclosure. A rotor assembly 202 is mechanically coupled by a first drive shaft 204 to a power input of a continuously variable transmission (CVT) 206. A power output of the CVT 206 is mechanically coupled by a second drive shaft 208 to an electrical generator 210. The electrical generator 210 converts rotational mechanical energy into electrical energy on conductors 212. In this way, kinetic energy of wind impinging upon the rotor assembly is converted into rotational mechanical energy of the first drive shaft 204, which is transmitted by the CVT 206 to the second drive shaft 208 and thence to the electrical generator 210, where it is converted into electrical energy.

A transmission transmits mechanical power applied to an input drive shaft to an output drive shaft. Typically, rotational speed of the output is different than that of the input. In a conventional wind power generator, a transmission comprising a fixed ratio gear box couples a low speed rotor assembly to a high speed electrical generator. In a vehicle, a transmission providing a fixed number of discrete gear ratios typically couples a high speed engine to low speed wheels. A CVT is characterized by providing a continuous range of ratios of input rotational speed to output rotational speed.

Continuously variable transmissions are widely known and understood. A CVT may comprise a pair of pulleys coupled by a belt, wherein the diameter of one or both pulleys may be varied. As the diameter of either or both pulleys is smoothly varied, the ratio of the rotational speeds of the input shaft and the output shaft varies smoothly. A CVT may alternatively comprise conical members coupled to the input and output shafts. A belt or roller may be coupled to both cones and transmit the rotational motion of the input cone to the output cone. If the cones are oriented so that their axes of rotation are parallel and the wide end of one cone is adjacent to the narrow end of the other cone, then movement of the belt or roller in the direction of the axes of rotation provides a continuous variation in the rotational speed ratio between the input shaft and output shaft.

Some types of CVTs are also known as infinitely variable transmissions (IVTs). An IVT may allow for an greater number of possible gear ratios and may be metal to metal rather than using traditional belts or rollers to transfer power.

The apparatus 200 may also comprise a tachometer 214 mechanically coupled to the first drive shaft 204. The tachometer 214 may generate a digital output signal indicating the rotational velocity of the first drive shaft 204. A controller 216 may be electrically coupled to the tachometer to receive the digital output signal. The controller 216 may also be electrically coupled to the CVT 206 to control its gear ratio. In this way, the controller 216 may control the CVT 206 according to the rotational speed of the drive shaft 204 received from the tachometer 214 in order to operate the electrical generator 210 in a desired range of rotational velocities. The desired range of velocities may be determined by a control signal input 218 to the controller 216.

While FIG. 2 depicts an apparatus having a tachometer measuring the rotational velocity of first drive shaft 204, it will be understood that in another embodiment a tachometer measuring the rotational velocity of second drive shaft 208 may provide an electrical speed signal for use by the controller 216 in controlling the CVT 206. In yet another embodiment, tachometers may be employed to measure the rotational velocities of both first drive shaft 204 and second drive shaft 208.

There may be an upper limit on the rotational velocity at which mechanical components of the apparatus 200 (such as the CVT 206, the electrical generator 210, or bearings supporting the drive shafts 204 or 208) may operate without experiencing excessive wear or mechanical failure. Where the components at risk are the second drive shaft 208 or the electrical generator 210, rotational velocity may be kept under the upper limit through the operation of the CVT 206.

However, in other situations a rotational speed ratio limit of the CVT 206 may prevent it from keeping the rotational velocity of the second drive shaft 208 or the electrical generator 210 under the upper limit. In still other situations the components at risk may be the first drive shaft 204 or the CVT 206 itself. In such situations, the apparatus 200 may also comprise a pitch actuator 220, electrically coupled to the controller 216. The pitch actuator 220 operates to change the pitch of blades in the rotor assembly 202 in order to reduce the rotational velocity of the rotor assembly 202 at a given wind velocity. In this way, as rotational velocities of components of the apparatus 200 approach an upper limit, the controller 216 may change the pitch of blades in the rotor assembly 202 in order to prevent rotational velocities from exceeding the upper limit.

At still higher wind velocities rotation of the rotor assembly may be prevented. In such situations, the blades of the rotor assembly may be turned edge-on to the wind to minimize torque generated in the rotor assembly. In another embodiment, the entire rotor assembly may be rotated in a substantially horizontal plane to a position in which it does not fully engage the wind-for example, a position where the wind impinges upon the rotor assembly from the side, rather than from the front. Furthermore, the CVT 206 or a separate brake (not shown in FIG. 2) may be used to prevent rotation of the drive shafts 204 and 208. In another embodiment, the drive shaft 204 may remain free to rotate while the drive shaft 208 is prevented from rotating by putting the CVT 206 into 'neutral'—that is, a condition in which the drive shaft 208 is decoupled from the drive shaft 204.

Figure 3:
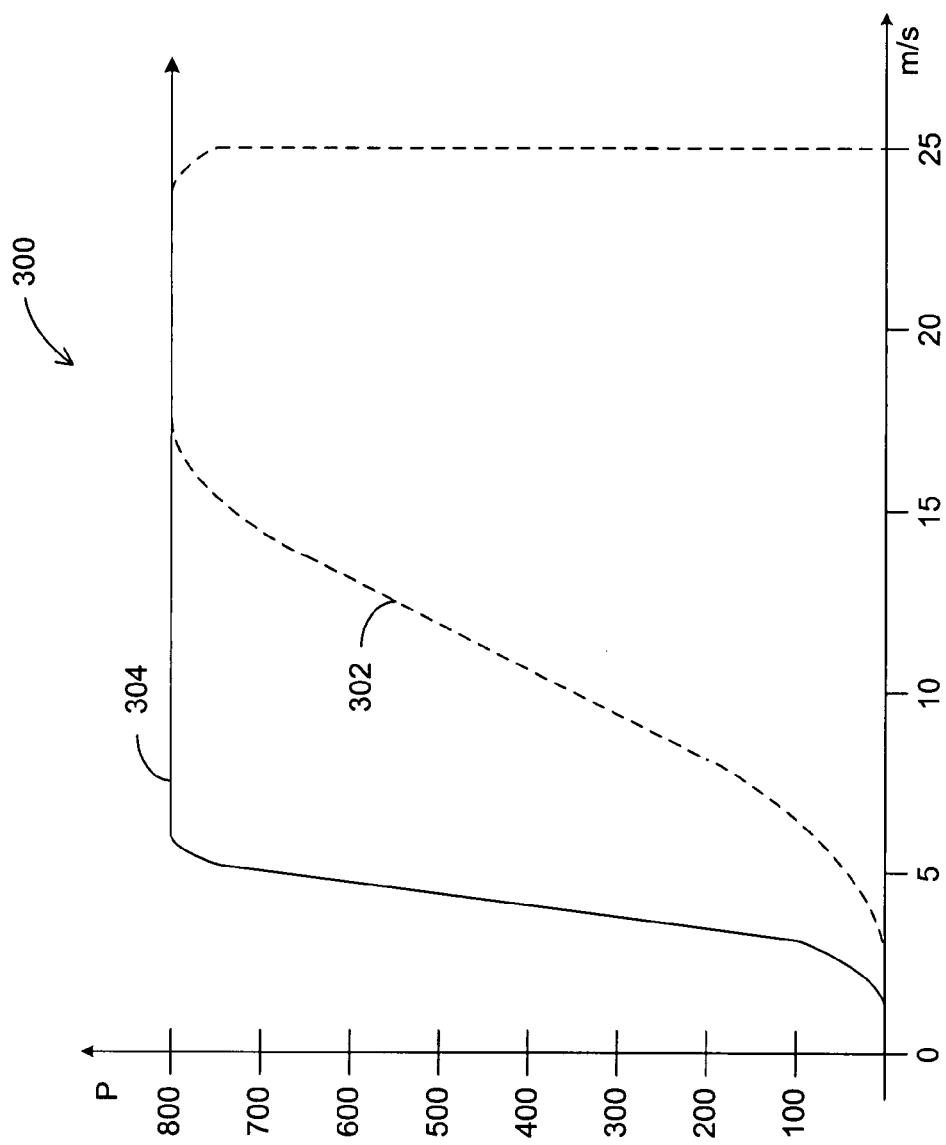
FIG. 3 presents illustrative power curves of a current wind power generation system and an augmented wind power generation system according to the disclosure.

FIG. 3 presents illustrative power curves of a traditional wind power generation system and an augmented wind power generation system according to the disclosure. Ambient wind speed is plotted along the horizontal axis and generated electrical power along the vertical axis.

An exemplary power curve for a traditional wind tower or conventional augmented wind power generation system is shown by dashed line 302. For wind speeds below a so-called cut-in wind speed of about 4 meters per second (m/s) the depicted system generates no electrical power. For wind speeds between about 4 m/s and 15 m/s an amount of electrical power proportional to the wind speed is generated. For wind speeds between about 15 m/s to 25 m/s the amount of power generated is substantially constant. The depicted system has a so-called cut-out wind speed of 25 m/s. Allowing a system to operate in winds above its cut-out speed may damage system components, so a system is typically braked or its rotor blades turned edge-on to the wind to minimize torque on the system.

In contrast, an augmented wind power generation system according to the present disclosure, such as that shown in FIG. 2, produces electrical power over a greater range of wind speeds, as may be seen in solid line 304. The CVT 206 may adjust or be adjusted to permit the electrical generator 210 to operate at or near an optimal rotational velocity for a broader range of wind speeds than a traditional wind tower or conventional augmented wind power generation system. A system of the present disclosure may begin generating power at a lower cut-in wind speed. For wind speeds from the cut-in velocity to a cut-out velocity (not shown in FIG. 3) the effective gear ratio of the CVT 206 may be adjusted to generate a constant level of electrical power.

A traditional wind tower or conventional augmented wind power generation system has a fixed ratio gear box designed to allow an electrical generator to operate in an optimal range of rotational speeds when wind speed is in a range typical for the site at which the system is installed. Such a gear box typically provides a step up in speed from the rotational velocity of the rotor assembly to that of the electrical generator, regardless of the wind speed. This design results in the electrical generator being 'over rotated' in winds above a certain speed-which determines the cut-out speed of such a traditional system.

In contrast, the CVT 206 may provide a step up in rotational velocity at lower wind speeds and a step down at higher wind speeds, allowing the electrical generator 210 to operate over a broader range of wind speeds. As described with regard to FIG. 2, however, an upper limit of wind speed may still exist for an augmented wind power generation system according to the present disclosure above which such a system should not be operated.

Figure 4:
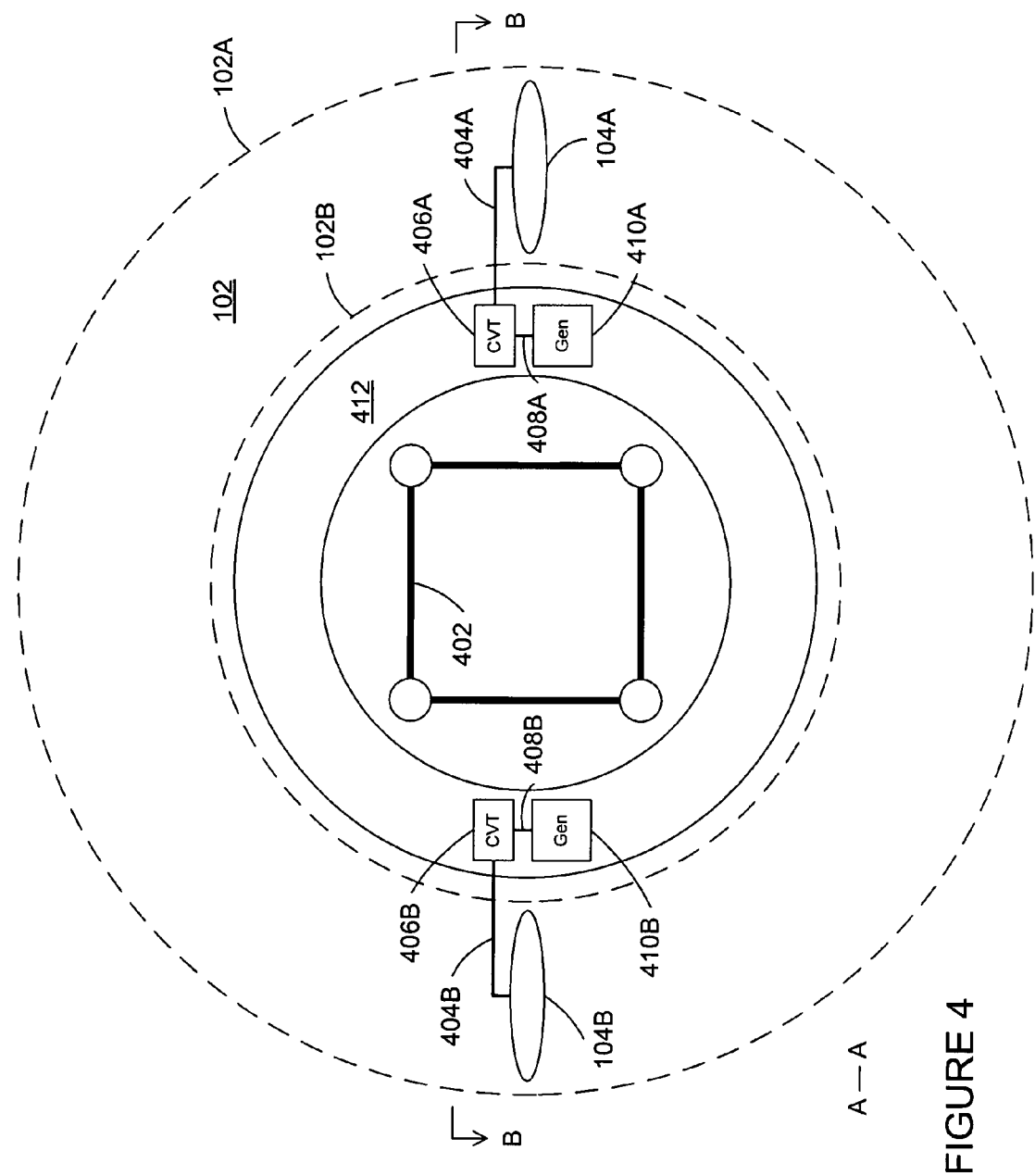
FIG. 4 presents a sectional view taken along line A-A in FIG. 1.

FIG. 4 presents a sectional view taken along line A-A in FIG. 1. The wind acceleration module 102 is mounted to a central tower 402. Dashed line 102A indicates an outermost extent of the contour of the module 102 and dashed line 102B indicates an innermost extent of the semi-toroidal hollow of the module 102. The rotor assemblies 104A and 104B are located within the semi-toroidal hollow of the module 102, as described with regard to FIG. 1.

Mechanically coupled to the rotor assembly 104A is a first drive shaft 404A, which is also mechanically coupled to a power input of a CVT 406A. A power output of the CVT 406A is mechanically coupled to a second drive shaft 408A, which is also mechanically coupled to an electrical generator 410A. Drive shaft 404B, CVT 406B, drive shaft 408B, and electrical generator 410B are similarly coupled to the rotor assembly 104B. Both sets of components are mounted on a platform 412, which is rotatably mounted to the central tower 402. Note that drive shafts 404A and 404B extend through one or more horizontal gaps in the wind acceleration module 102 or between adjacent wind acceleration modules 102.

Because the platform 412 may rotate about the central tower 402, when the direction of the wind changes the platform 412 may be repositioned so that the rotor assemblies 104A and 104B face into the wind. In this new position, the electrical generators 410A and 410B may generate more electrical power than in a previous position.

Figure 5:
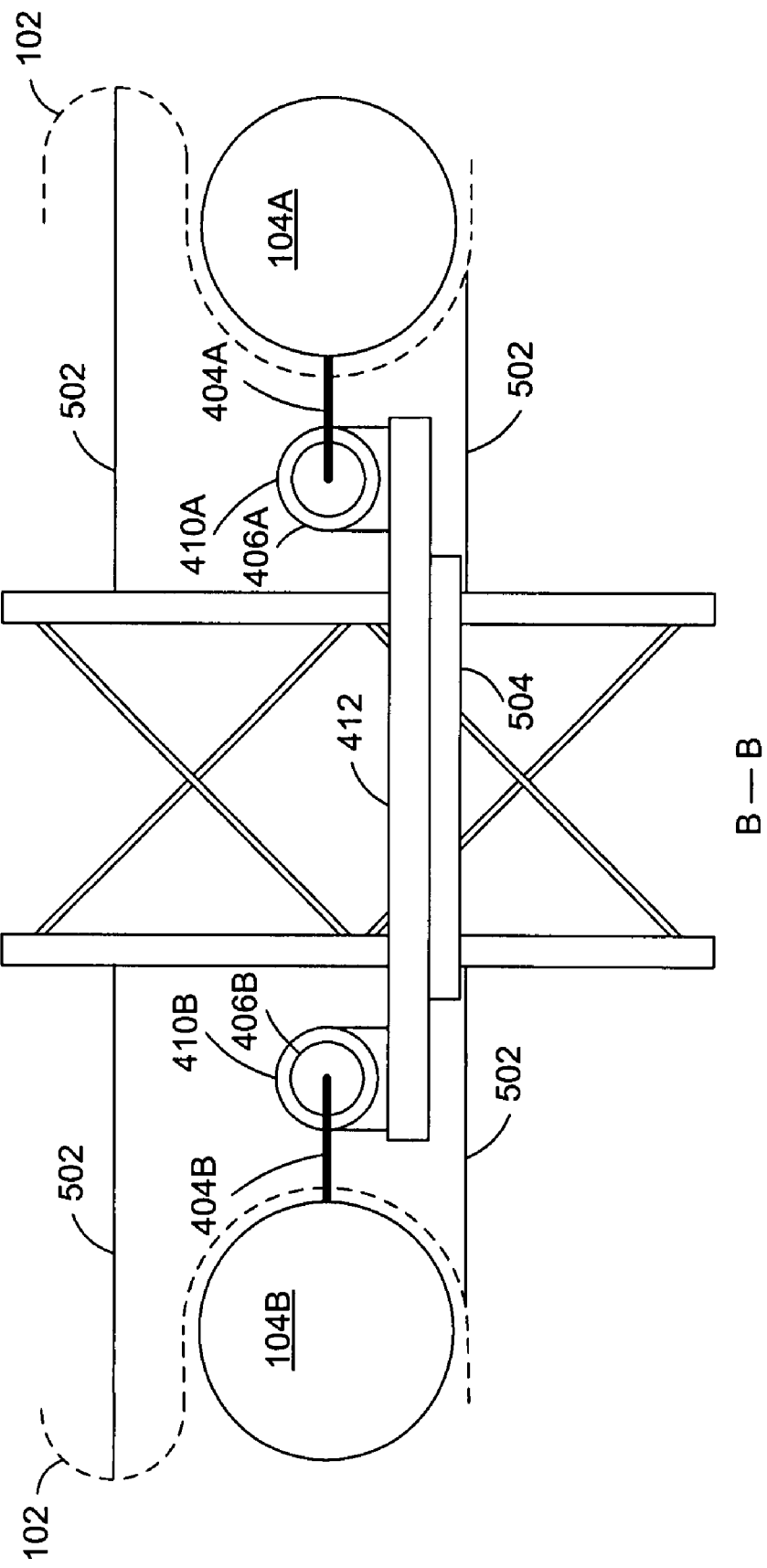
FIG. 5 depicts a sectional view taken along line B-B in FIG. 4.

FIG. 5 depicts a sectional view taken along line B-B in FIG. 4. The contour of the wind acceleration module 102 is depicted with dashed lines. The module 102 is mounted to the central tower 402 by struts 502. It may be seen that a second module 102 may be mounted to the central tower 402 below the first module 102, shown in FIG. 5, such that the upper portion of the second module 102 and the lower portion of the first module 102 mate to produce a substantially unbroken surface.

As described with regard to FIG. 4, the rotor assembly 104A, the drive shaft 404A, the CVT 406A and the electrical generator 410A are mounted on one side of the platform 412. The comparable components mechanically coupled to the rotor assembly 104B are mounted to the other side of the platform 412. The platform 412 is rotatably mounted to the central tower 402 by a bearing assembly 504. A wiring harness or other electrical coupling system (not shown in FIG. 5) may be used to combine into a single output the electrical power produced by the electrical generators 104A and 104B and generators in other wind acceleration modules.

Although the present disclosure has been described with an exemplary embodiment, various changes and modifications may be suggested to one skilled in the art. For example, in another embodiment, a conventional wind-driven power generation system having a single rotor rotating about a hub located at or near the top of the tower may employ a CVT to couple the rotor to an electrical generator. In yet another embodiment, an augmented wind power generation system having a different wind funneling apparatus than that shown in FIG. 1 may be used. In still another embodiment, such an augmented wind power generation system may include only a single rotor assembly, which may be fully shrouded, rather than partially shrouded, as shown in FIG. 1. It is intended that the present disclosure encompass such changes and modifications as fall within the scope of the appended claims.

What is claimed is:

1. A wind power generating system, comprising a plurality of vertically stacked wind acceleration modules shaped to accelerate wind passing through the modules, wherein a first one of the plurality of modules comprises:
   a rotor assembly;
   a continuously variable transmission (CVT) mechanically coupled to the rotor assembly;
   an electrical generator mechanically coupled to the CVT;
   a sensor mechanically coupled to one of the rotor assembly and the electrical generator; and
   a controller electrically coupled to the sensor and to the CVT,
   wherein the electrical generator is configured to convert mechanical energy transferred by the CVT from the rotor assembly into electrical energy, and
   wherein the controller is configured to determine a range of rotational velocities and is configured to control the CVT such that the electrical generator operates within the range of rotational velocities, the range of rational velocities being based upon a signal received from the sensor.

2. The system of claim 1, wherein the controller is further configured to control the CVT to prevent rotation of the electrical generator.

3. The system of claim 1, wherein the rotor assembly further comprises a pitch control mechanism electrically coupled to the controller and the controller is further configured to control a pitch of the rotor assembly according to the signal received from the sensor.

4. The system of claim 1, wherein the first one of the plurality of modules is substantially circularly symmetrical about a vertical axis and the rotor assembly is configured to move within the module along a circular path concentric with the axis of symmetry of the module.

5. The system of claim 4, further comprising a tower, wherein the rotor assembly, CVT and electrical generator are mounted on a platform and the platform is rotatably mounted to the tower.

6. The system of claim 5, wherein the first one of the plurality of modules further comprises a second rotor assembly, CVT and electrical generator mounted on the platform.

7. The system of claim 6, wherein the platform is configured to rotate from a first position to a second position, wherein the electrical energy generated by the electrical generator in the second position is greater than the electrical energy generated by the electrical generator in the first position.

8. A method of generating electrical power from wind, for use with a plurality of vertically stacked wind acceleration modules, the method comprising:
   transmitting mechanical energy from a rotor assembly mounted in one of the plurality of modules to an electrical generator through a transmission having an input mechanically coupled to the rotor assembly and an output;
   varying the ratio of the rotational speed of the transmission input to the rotational speed of the transmission output over a continuous range of values; and
   generating electrical energy with an electrical generator mechanically coupled to the transmission output,
   wherein the plurality of vertically stacked wind acceleration modules are shaped to accelerate wind passing through the modules, and
   wherein the electrical generator operates within a range of rotational velocities, the range of rotational velocities being based upon a signal received from a sensor mechanically coupled to one of the rotor assembly and the electrical generator.

9. The method of claim 8, further comprising sensing a rotational speed of one of the transmission input and the transmission output,
   wherein varying the ratio further comprises varying the ratio according to the sensed rotational speed such that the electrical generator operates within a predetermined range of rotational speeds.

10. The method of claim 9, further comprising preventing transmission of mechanical energy from the rotor assembly to the rotating electrical generator according to the sensed rotational speed.

11. The method of claim 9, further comprising controlling a pitch of the rotor assembly according to the sensed rotational speed.

12. The method of claim 8, wherein the one of the plurality of modules is substantially circularly symmetrical about a vertical axis and the method further comprises moving the rotor assembly within the module along a circular path concentric with the axis of symmetry of the module.

13. The method of claim 12, wherein the rotor assembly and electrical generator are mounted on a platform, the method further comprising rotating the platform about a tower from a first position to a second position, wherein the electrical energy generated by the electrical generator in the second position is greater than the electrical energy generated by the electrical generator in the first position.

14. A wind power generating apparatus, comprising:
   a rotor assembly;
   a continuously variable transmission (CVT) mechanically coupled to the rotor assembly; and
   an electrical generator mechanically coupled to the CVT,
   wherein the electrical generator is configured to convert mechanical energy transferred by the CVT from the rotor assembly into electrical energy,
   wherein the wind power generating apparatus is coupled to an acceleration module shaped to accelerate wind passing through the module, and
   wherein the electrical generator operates within a range of rotational velocities, the range of rotational velocities being based upon a signal received from a sensor mechanically coupled to one of the rotor assembly and the electrical generator.

15. The apparatus of claim 14, wherein the controller is further configured to control the CVT to prevent rotation of the electrical generator.

16. The apparatus of claim 14, wherein the rotor assembly further comprises a pitch control mechanism electrically coupled to the controller and the controller is further configured to control a pitch of the rotor assembly according to the signal received from the sensor.

17. The apparatus of claim 14, further comprising a second rotor assembly, CVT and electrical generator.

18. The apparatus of claim 17, wherein the first and second rotor assembly, CVT and electrical generator are configured to move from a first position to a second position, wherein the electrical energy generated by the electrical generator in the second position is greater than the electrical energy generated by the electrical generator in the first position.

* * * * *